US005393826A

United States Patent [19]

Huver et al.

[11] Patent Number: 5,393,826

[45] Date of Patent: Feb. 28, 1995

[54] ACTIVATOR FOR CYANOACRYLATE ADHESIVES

[75] Inventors: Thomas Huver, Duesseldorf; Christian Nicolaisen, Ronnenberg; Susanne Camp, Hannover, all of Germany

[73] Assignee: Henkel Kommanditgesellschaft auf Aktien, Duesseldorf, Germany

[21] Appl. No.: 133,096

[22] PCT Filed: Apr. 7, 1992

[86] PCT No.: PCT/EP92/00787

§ 371 Date: Oct. 12, 1993

§ 102(e) Date: Oct. 12, 1993

[87] PCT Pub. No.: WO92/18576

PCT Pub. Date: Oct. 29, 1992

[30] Foreign Application Priority Data

Apr. 16, 1991 [DE] Germany .......................... 4112313.1

[51] Int. Cl.[6] ........................ C08K 5/17; C08C 19/22; C08F 8/32

[52] U.S. Cl. .................................... 524/722; 526/298; 525/379; 525/380; 524/244

[58] Field of Search ................ 524/722, 244; 526/298; 525/328.2, 379, 380

[56] References Cited

U.S. PATENT DOCUMENTS

| | | | |
|---|---|---|---|
| 3,254,111 | 5/1966 | Hawkins et al. | 260/465.4 |
| 3,260,637 | 7/1966 | von Bramer | 156/314 |
| 3,654,340 | 4/1972 | Banitt | 260/465.4 |
| 3,940,362 | 2/1976 | Overhults | 260/42.16 |
| 4,200,549 | 4/1980 | Okamura et al. | 524/722 |

FOREIGN PATENT DOCUMENTS 2413406 10/1975 Germany .

OTHER PUBLICATIONS

Polym. Prepr. Am. Chem. Soc., Div. Polym. Chem., 19(2), "New Amine Accelerators for Composite Restorative Resins" by G. M. Brauer, D. M. Dulik, J. Antonucci, H. Argentar, pp. 585–590.

Ullmann's Encyclopedia of Industrial Chemistry, vol. A1, p. 240, Verlag Chemie Weinheim (1985).

*Primary Examiner*—Paul R. Michl
*Assistant Examiner*—LaVonda R. DeWitt
*Attorney, Agent, or Firm*—Ernest G. Szoke; Wayne C. Jaeschke; John Daniel Wood

[57] ABSTRACT

An activator for cyanoacrylate adhesives based on N,N-dialkyl aniline derivatives is provided. The activators are characterized by a molecular weight of more than 200 and by at most 3 carbon atoms for both N,N-dialkyl substituents together. Also provided are methods of production and use of the activator and to the combination product of the activator and the cyanoacrylate adhesive.

36 Claims, No Drawings

ACTIVATOR FOR CYANOACRYLATE ADHESIVES

BACKGROUND OF THE INVENTION

1. Field of the Invention

This invention relates to an activator for cyanoacrylate adhesives based on N,N-dialkyl aniline derivatives, to its production and use and to the combination product of the activator and the cyanoacrylate adhesive.

An "activator" is generally understood to be an accelerator used separately to cure a chemically reacting one-component adhesive. In the present case, the polymerization of 2-cyanoacrylates in particular is activated.

2. Discussion of Related Art

Activators as defined above are known. Thus, DE-OS 24 13 406 describes particles of a porous support impregnated with an N,N-dialkyl-substituted aniline containing 1 to 4 carbon atoms in the alkyl radical for initiating the delayed polymerization of monomeric cyanoacrylates. The delay is brought about by the porous supports. The N,N-dialkyl-substituted anilines used include N,N-dimethyl aniline, N,N,2,4-tetramethyl aniline, N,N,3,5-tetramethyl aniline, N,N-dimethyl-otoluidine, N,N-dimethyl-m-toluidine, N,N-dimethyl-ptoluidine, N-methyl-N-phenylbenzyl amine and/or their corresponding N-ethyl and N,N-diethyl derivatives.

N,N-Dimethyl-p-toluidine is preferred. The adhesive bonds obtained are not transparent. The invention is intended for the field of dental medicine. The disadvantage that N,N-dimethyl toluidine is toxic and has an unpleasant odor is particularly serious in this case.

Accordingly, there has been no shortage of attempts to use less toxic activators. In Polym. Prepr., Am. Chem. Soc., Div. Polym. Chem., 19(2), pages 585–90, aniline derivatives were investigated both from this viewpoint and for cure time, strength and color stability. Besides N,N-dimethyl toluidine and xylidine, 4-N,N-dimethylaminobenzaldehyde and benzoic acid and methyl esters thereof were among the aniline derivatives investigated. Although these compounds may be less toxic, they are still unsuitable for use as activators because they activate far too weakly, if at all. Other activators rapidly form a skin with subsequent slow curing when solutions thereof are sprayed onto a monomeric cyanoacrylate layer. The shock-like curing at the surface results in a wrinkled structure which, in addition, destroys transparency in most cases.

Accordingly, N,N-dimethyl toluidine remains the only effective activator for cyanoacrylates. Since it is classified as a "T substance" under the legislation on chemicals, this activator has to be used in a concentration of more than 1%. Further disadvantages of the known activator are its volatility, which releases DMT even after bonding, and .the unpleasant odor associated therewith.

Accordingly, the problem addressed by the present invention was to remedy this situation by providing an activator which would have few, if any, of these disadvantages and which would be better in its handling and performance properties than known activators, particularly in regard to the balance between discoloration, transparency, odor, curing behavior, strength and surface structure.

DESCRIPTION OF THE INVENTION

The solution provided by the invention is defined in the claims. It lies in the choice of certain tertiary aniline derivatives containing an alcohol group which correspond to the following general formula

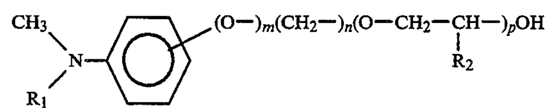

in which $R_1$ is a $CH_3$ or $C_2H_5$ group, $m=0$ or 1, $n=0$, 1 or 2; where $m=1$, $n\neq 0$, $R_2$ is an H atom or a $CH_3$ group and $p=0$ to 10.

"Based on" means that the activator is largely built up on the effect of the aniline derivatives according to the invention. In addition, it may also contain inert liquids or solids.

The dialkyl aniline derivatives according to the invention are used mainly in the form of a solution in organic solvents. However, not only should the solvent dissolve the dialkyl aniline derivatives according to the invention, it should also be soluble in the monomeric cyanoacrylate. In addition, it should be inert to the dialkyl aniline derivatives according to the invention and should readily evaporate at room temperature. Suitable solvents are ketones, such as acetone and methyl ethyl ketone; esters, such as ethyl, propyl or butyl acetate; chlorinated hydrocarbons, such as methylene chloride or 1,1,1-trichloroethane; aromatic hydrocarbons, such as toluene; and aliphatic hydrocarbons, such as n-heptane. The dialkyl aniline derivatives according to the invention are best dissolved in a concentration of 0.1 to 5% by weight and preferably in a concentration of 0.5 to 2% by weight.

In addition, the solution may contain other substances, for example dyes or optical brighteners, to enable its application to be better controlled.

The solutions containing the aniline derivatives according to the invention may be applied to the surfaces to be treated in finely dispersed form by immersion, spraying, spreading or any other suitable method. They may be applied to the parts to be joined both before and after the cyanoacrylate adhesive. An activator is preferably applied before or afterwards.

In one advantageous embodiment, however, the activator according to the invention may also be mixed with powder to form a paste which, after mixing with cyanoacrylate adhesive, may be used to seal gaps or to fill cavities.

N,N-dialkyl aniline derivatives corresponding to the general formula with $m=0$ and $n=0$, i.e. derivatives of N,N-dialkylaminophenol, are preferred. They may be obtained by reaction of N,N-dialkylaminophenol with ethylene oxide or propylene oxide.

However, the corresponding reaction products with N,N-dialkylaminobenzyl alcohol are also eminently suitable as activators; in their case, $m=0$ and $n=1$.

The N,N-dialkyl compounds are N,N-dimethyl compounds, i.e. $R_1$ is preferably a methyl group.

In general, both constituents are in the position, although their m-position also leads to good results.

A third substituent may be present in addition to the two substituents in the general formula, namely an alkyl group containing 1 to 3 carbon atoms and preferably 1 carbon atom.

The present invention also relates to a combination product for bonding parts to be joined which contains a cyanoacrylate adhesive in addition to the N,N-dialkyl derivatives according to the invention. The cyanoacrylate adhesive consists essentially of monomeric cyanoacrylates corresponding to the general formula $H_2C=C(CN)$ —COOR, where R is an alkyl, alkenyl, cycloalkyl, aryl, alkoxyalkyl, aralkyl or haloalkyl group, more particularly a methyl, ethyl, n-propyl, isopropyl, n-butyl, isobutyl, pentyl, hexyl, allyl, methallyl, crotyl, propargyl, cyclohexyl, benzyl, phenyl, cresyl, 2-chloroethyl, 3-chloropropyl, 2-chlorobutyl, trifluoroethyl, 2-methoxyethyl, 3-methoxybutyl and 2-ethoxyethyl group. The cyanoacrylates mentioned above are known to the expert on adhesives, see Ullmann,s Encyclopedia of Industrial Chemistry, Vol. A1, page 240, Verlag Chemie Weinheim (1985), and US-PSS 3,254,111 and 3,654,340.

The activators according to the invention have above all the following positive effects:

They can also act as a primer, i.e. increase bond strength after priming.

They enable the cure time to be adjusted under control which provides for safe working.

They lead to transparent colorless bonds, i.e. the use of the activators according to the invention produces hardly any visible changes, such as wrinkling or white discoloration.

They have a good technical property profile comparable with that of the known N,N-dimethyl toluidine.

The reduction in strength is negligible.

There is no evidence of any odor.

Toxicity is reduced.

EXAMPLES

The invention is illustrated by the following Examples.

I Production of an activator according to the invention

Preparation of p-dimethylaminobenzyl alcohol

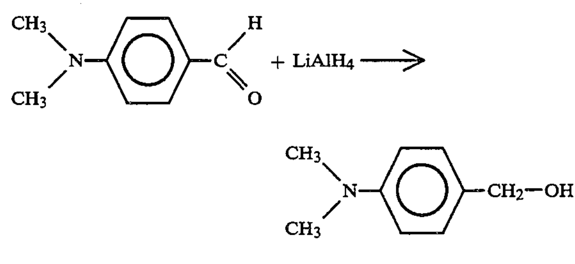

Reactants:

10 g $LiAlH_4$≙
131.3 g p-dimethylaminobenzaldehyde=0.88 mol
400 ml THF (dried on a molecular sieve)
200 ml toluene Procedure: 10 g $LiAlH_4$ in 200 ml THF were introduced into an evacuated, scoured stirred reactor purged with nitrogen. Dimethylaminobenzaldehyde dissolved in 400 ml THF: toluene (1:1) is then added dropwise with stirring at a such a rate that a gentle reflux is established. After the addition, the mixture is heated for 1 hour at the boiling temperature. 50 ml ice water are then added dropwise while cooling with ice so that excess $LiAlH_4$ decomposes (=>$H_2$ evolution!). The lithium-+aluminum salts formed are then filtered off and washed twice with 50 ml ether. The filtrate is dried over KOH pellets. The solvent is then removed in a rotary evaporator. The residue is distilled in an oil vacuum.

Bp.: 95° C./0.2 mbar
Yield: 91.1 g ≙68%

II. The activators were tested according to the following criteria:

a) cure rate after activation,
b ) transparency and
c) odor of the activator.

The cure rate on subsequently activated surfaces was determined as follows:

A drop and a bead of cyanoacrylate adhesive are also applied to degreased aluminum test stips. Premature polymerization is obtained by subsequent spraying with a 2% activator solution. In practice, this is a method of curing excess adhesive.

III Test results

With the cyanoacrylate adhesive SICOMET 8300 of Sichel-Werke GmbH (basis: ethyl cyanoacrylate), the activators according to the invention showed the following results which were compared with those of N,N-dimethyl toluidine (DMT):

The activator according to the invention had a far less unpleasant odor than DMT.

The appearance of the adhesive cured with the activator according to the invention corresponds to that of the dimethyl toluidine-activated adhesive. The same also applies in particular to transparency and colorlessness.

The strength and cure times were substantially the same.

The comparison compounds 4-(N,N-dimethylamino)-benzyl alcohol and benzoic acid ethyl ester did not cure one drop of adhesive, even after 1 hour.

These results show that the compounds according to the invention are far superior in regard to curing to structurally the closest compounds and that they are equivalent in their technical data and even superior in their odor to the commercial activator DMT.

We claim:

1. In a method of activating the cure of cyanoacrylate adhesives the improvement comprising using as an activator an N,N-dialkyl aniline derivative having the following general formula

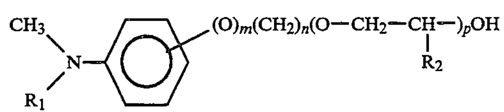

in which $R_1$ is a $CH_3$ or $C_2H_5$ group,
m=0 or 1,
n=0, 1 or 2; n≠0 where m=1
$R_2$ is an H atom or a $CH_3$ group and
p=0 to 10.

2. A method as claimed in claim 1 wherein m=0 and n=0.

3. A method as claimed in claim 1 wherein m=0 and n=1.

4. A method as claimed in claim 1 wherein R=$CH_3$.

5. A method as claimed in claim 1 wherein the subsituents are in the orthoposition.

6. A method as claimed in claim 1 wherein another alkyl substituent containing 1 to 3 carbon atoms is present as a substituent of the benzene ring of said formula.

7. A method as claimed in claim 1 wherein said N,N-dialkyl aniline derivative is in the form of a 0.1 to 5% by weight solution in an organic solvent.

8. A method as claimed in claim 1 wherein said N,N-dialkyl aniline derivative is in the form of an impregnation of porous powders.

9. A method as claimed in claim 1 wherein p=0.

10. A method as claimed in claim 1 wherein m=0, $R_1$=$CH_3$, and p=0.

11. A method as claimed in claim 10 wherein n=0.

12. A method as claimed in claim 10 wherein n=1.

13. A process for bonding parts to be joined with an adhesive joint, said process comprising applying an activator to at least one of said parts before and/or after a cyanoacrylate adhesive is applied to at least one of said parts, wherein said activator is an N,N-dialkyl aniline derivative having the following general formula

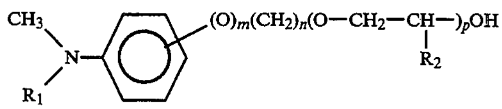

in which $R_1$ is a $CH_3$ or $C_2H_5$ group, m=0 or 1, n=0, 1 or 2; n≠0 where m=1

$R_2$ is an H atom or a $CH_3$ group and p=0 to 10.

14. A process as claimed in claim 13 wherein m=0 and n=0.

15. A process as claimed in claim 13 wherein m=0 and n=1.

16. A process as claimed in claim 13 wherein $R_1$=$CH_3$.

17. A process as claimed in claim 13 wherein the subsituents are in the orthoposition.

18. A process as claimed in claim 13 wherein another alkyl substituent containing 1 to 3 carbon atoms is present as a substituent of the benzene ring of said formula.

19. A process as claimed in claim 13 wherein said N,N-dialkyl aniline derivative is in the form of a 0.1 to 5% by weight solution in an organic solvent.

20. A process as claimed in claim 13 wherein said N,N-dialkyl aniline derivative is in the form of an impregnation of porous powders.

21. A process as claimed in claim 13 wherein p=0.

22. A process as claimed in claim 13 wherein m=0, $R_1$=$CH_3$, and p=0.

23. A process as claimed in claim 22 wherein n=0.

24. A process as claimed in claim 22 wherein n=1.

25. A composition of matter useful for bonding parts to be joined comprising a cyanoacrylate adhesive and an N,N-dialkyl aniline derivative having the following general formula

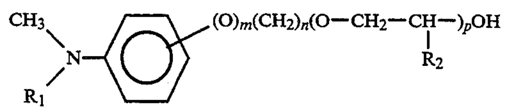

in which $R_1$ is a $CH_3$ or $C_2H_5$ group, m=0 or 1, n=0, 1 or 2; n≠0 where m=1

$R_2$ is an H atom or a $CH_3$ group and p=0 to 10.

26. A composition as claimed in claim 25 wherein m=0 and n=0.

27. A composition as claimed in claim 25 wherein m=0 and n=1.

28. A composition as claimed in claim 25 wherein $R_1$=$CH_3$.

29. A composition as claimed in claim 25 wherein the subsituents are in the ortho-position.

30. A composition as claimed in claim 25 wherein another alkyl substituent containing 1 to 3 carbon atoms is present as a substituent of the benzene ring of said formula.

31. A composition as claimed in claim 25 wherein said N,N-dialkyl aniline derivative is in the form of a 0.1 to 5% by weight solution in an organic solvent.

32. A composition as claimed in claim 25 wherein said N,N-dialkyl aniline derivative is in the form of an impregnation of porous powders.

33. A composition as claimed in claim 25 wherein p=0.

34. A composition as claimed in claim 25 wherein m=0, R=$CH_3$, and p=0.

35. A process as claimed in claim 34 wherein n=0.

36. A process as claimed in claim 34 wherein n=1.

* * * * *